United States Patent [19]

Mizuguchi et al.

[11] 4,322,324
[45] Mar. 30, 1982

[54] AMPHO-IONIC GROUP-CONTAINING ALKYD RESINS

[75] Inventors: Ryuzo Mizuguchi, Yawata; Shin-ichi Ishikura, Tsuzuki; Keizo Ishii, Ashiya, all of Japan

[73] Assignee: Nippon Paint Co., Ltd., Osaka, Japan

[21] Appl. No.: 208,641

[22] Filed: Nov. 20, 1980

[30] Foreign Application Priority Data

Apr. 26, 1980 [JP] Japan .................. 55/56048

[51] Int. Cl.³ ............................................. C08G 63/68
[52] U.S. Cl. ........................................ 528/290; 528/294
[58] Field of Search ................. 525/3; 528/290, 289, 528/291, 294; 260/22 T, 22 A, 22 D, 22 CQ

[56] References Cited

U.S. PATENT DOCUMENTS

| | | | | |
|---|---|---|---|---|
| 3,168,546 | 2/1965 | Ballauf | .................. | 525/3 |
| 3,894,077 | 7/1975 | Horikawa | .................. | 525/3 |
| 4,080,315 | 3/1978 | Login | .................. | 525/3 |

Primary Examiner—Paul R. Michl
Attorney, Agent, or Firm—Haight, Rosfeld & Noble

[57] ABSTRACT

An alkyd resin containing ampho-ionic groups of the formula:

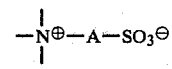

wherein A is a $C_1$–$C_6$ alkylene or a phenylene group, is disclosed. Said resin is prepared by reacting a polyol, a polybasic acid and an ampho-ionic compound of the formula:

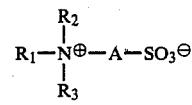

wherein A is as defined above, $R_1$ is a hydroxyalkyl, $R_2$ and $R_3$ are H or alkyl optionally containing sulfo and/or hydroxyl group.

11 Claims, No Drawings

AMPHO-IONIC GROUP-CONTAINING ALKYD RESINS

This invention relates to novel alkyd resins containing ampho-ionic groups which are suitable for the preparation of solvent type coating compositions.

It has been known that ampho-ionic compounds exhibit unique physical and chemical properties. Usually they are not compatible with solvent type coating compositions.

It has now been found that certain types of ampho-ionic compounds may be incorporated into alkyd resins as reaction components to give ampho-ionic group-containing alkyd resins suitable for the preparation of solvent type protective coating compositions. The resulting resins exhibit excellent properties as compared with corresponding resins free from such groups e.g. in viscosity and pigment dispersing characteristics.

In accordance with the present invention, an alkyd resin containing ampho-ionic groups of the formula:

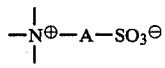

wherein A is a $C_1-C_6$ alkylene or a phenylene group, is provided. Said resin comprises, as the reaction components, (a) a polyol, (b) a polybasic carboxylic acid, and (c) an ampho-ionic compound of the formula:

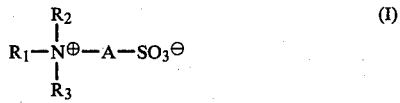

(I)

wherein A is as defined above, $R_1$ is a $C_1-C_{20}$ alkyl group containing at least one hydroxyl group, $R_2$ and $R_3$ are the same or different and each is a hydrogen atom, a $C_1-C_{20}$ alkyl group optionally containing at least one sulfo and/or hydroxy group. Other components such as oxirane ring-containing compounds or oil modifiers may be incorporated. The resins may be used as the vehicles of solvent type coating compositions either alone or in combination with an aminoplast such as melamine, guanamine or urea resins.

As is well-known, alkyd resins comprise, as the essential components, a polyol and a polybasic carboxylic acid for oil-free type, and an oil modifier in addition to said polyol and said polycarboxylic acid for oil modified type.

Other modified alkyd resins such as rosin modified, phenol modified, epoxy modified, vinyl modified, isocyanate modified, silicone modified, etc. are also known. The term "alkyd resin" used herein includes all of these types.

The alkyd resins of this invention may be prepared by reacting conventional alkyl resin-components in the presence of an ampho-ionic compound of the formula I in accordance with conventional methods which are well-known in the art such as those described in D. H. Solomon, "The Chemistry of Organic Film Formers", pages 75-87, John Wiley & Sons (1967).

The polyols which may be used in the present invention include, for example, ethylene glycol, propylene glycol, 1,3-butylene glycol, 1,6-hexanediol, diethylene glycol, dipropylene glycol, neopentyl glycol, triethylene glycol, 2,2-dimethyl-3-hydroxypropyl 2,2-dimethyl-3-hydroxypropionate, hydrogenated bisphenol A, bisphenol A dihydroxypropyl ether, glycerine, trimethylolethane, trimethylolpropane, tris-(hydroxymethyl)aminomethane, pentaerythritol and mixtures thereof. The amount of polyol reactants may vary from 2 to 90% by weight based on the total weight of the reaction components.

Representative examples of the polybasic acids which may be employed include phthalic anhydride, isophthalic acid, terephthalic acid, succinic anhydride, adipic acid, azelaic acid, sebacic acid, tetrahydrophthalic anhydride, hexahydrophthalic anhydride, tetrabromophthalic anhydride, tetrachlorophthalic anhydride, Chlorendic anhydride, Nadic anhydride, maleic anhydride, fumaric acid, itaconic acid, trimellitic anhydride, methylcycloxenetricarboxylic anhydride, pyromellitic anhydride and mixtures thereof. The amount of polybasic carboxylic acid components may vary from 2 to 90% by weight based on the total weight of the reaction components.

Representative examples of oil modifiers which may be employed in the oil modified compositions of the present invention include castor oil, coconut oil, linseed oil, palm oil, safflower oil, soybean oil, tung oil, dehydrated castor oil, tall oil, fatty acid derived from these oils, long chain synthetic fatty acids and the like. The amount of oil modifiers may vary from 1 to 80% by weight based on the total weight of the reaction components.

Examples of oxirane ring-containing compound which may be employed in the present invention include α-olefine oxides; glycidyl ethers such as phenyl glycidyl ether, methyl glycidyl ether and the like; and glycidyl esters such as versatic acid glycidyl ester and the like. The amount of these components may be less than 90% by weight based on the total weight of the reaction components.

To form the ampho-ionic group-containing alkyd resins of the present invention, the reaction components as described above which are conventionally used for the preparation of alkyd resins are reacted in the presence of an ampho-ionic compound of the formula I. Examples of the ampho-ionic compounds which may be employed for this purpose include N-(2-hydroxyethyl)aminomethanesulfonic acid, N- and N,N-di-alkyl e.g. methyl, ethyl, isopropyl, 2-ethylhexyl, decyl, stearyl derivatives thereof; N-(2-hydroxy-1-methylethyl)aminomethanesulfonic acid, N- and N,N-di-alkyl derivatives thereof; N-(3-hydroxypropyl)aminomethanesulfonic acid, N- and N,N-di-alkyl derivatives thereof; N-(2-propyl-2-hydroxyethyl)aminomethanesulfonic acid, N- and N,N-di-alkyl derivatives thereof; N-(2-methyl-2-ethyl-2-hydroxyethyl)aminomethanesulfonic acid, N- or N,N-di-alkyl derivatives thereof; N-(1,2-dimethyl-2-hydroxyethyl)aminomethanesulfonic acid, N- or N,N-di-alkyl derivatives thereof; N-(1,1,2,2-tetramethyl-2-hydroxyethyl)aminomethanesulfonic acid, N- and N,N-di-alkyl derivatives thereof; N-(1,5,5-trimethyl-5-hydroxypentyl)aminomethanesulfonic acid, N- and N,N-di-alkyl derivatives thereof; N-(1,2-diisopropyl-2-hydroxyethyl)aminomethanesulfonic acid, N- and N,N-di-alkyl derivatives thereof; N-(2,3-dihydroxypropyl)aminomethanesulfonic acid, N- and N,N-dialkyl derivatives thereof; N-(1-hydroxymethyl-2-hydroxyethyl)aminomethanesulfonic acid, N- and N,N-di-alkyl derivatives thereof; N-(1-hydroxymethyl-2-hydroxypropyl)aminomethanesulfonic acid, N- and N,N-dialkyl derivatives thereof; N-(1-hydroxymethyl-3-hydroxypropyl)aminomethanesulfonic acid, N- and N,N-di-alkyl derivatives thereof; N-(1-hydroxymethyl-4-hydroxybutyl)aminomethanesulfonic acid, N- and N,N-di-alkyl derivatives thereof; N-{1,1-bis(hydroxymethyl)-2-hydroxyethyl}-aminomethanesulfonic acid, N- and N,N-di-alkyl derivatives thereof; N-{2,2-bis(hydroxymethyl)-3-hydroxypropyl}aminomethanesulfonic acid, N- and N,N-di-alkyl derivatives thereof; N,N-bis-(2-hydroxyethyl)aminomethanesulfonic acid and N-alkyl derivatives thereof; N-2-hydroxyethyl-N-2-hydroxypropylaminomethanesulfonic acid and N-alkyl derivatives thereof; N,N-bis(2-hydroxypropyl)aminomethanesulfonic acid and N-alkyl derivatives thereof; N,N-bis(4-hydroxybutyl)aminomethanesulfonic acid and N-alkyl derivatives thereof; N-2-hydroxyethyl-N-{1,1-bis(hydroxymethyl)-2-hydroxyethyl}-aminomethanesulfonic acid and N-alkyl derivatives thereof; N-3-hydroxypropyl-N-{1,1-bis(hydroxymethyl)-2-hydroxyethyl}aminomethanesulfonic acid and N-alkyl derivatives thereof; N,N-bis(2,3-dihydroxypropyl)aminomethanesulfonic acid and N-alkyl derivatives thereof; N,N-bis(1-hydroxymethyl-2-hydroxyethyl)aminomethanesulfonic acid and N-alkyl derivatives thereof; N,N-bis{1,1-bis(hydroxymethyl)-2-hydroxyethyl}aminomethanesulfonic acid and N-alkyl derivatives thereof; N,N,N-tris(2-hydroxyethyl)ammoniomethane sulfonic acid betaine; N,N-bis(2-hydroxyethyl)-N-3-hydroxypropylammoniomethanesulfonic acid betaine; N,N,N-tris(3-hydroxypropyl)ammoniomethanesulfonic acid betaine; N-(2-hydroxyethyl)aminoethanesulfonic acid, N- and N,N-dialkyl derivatives thereof; N-(2-hydroxy-1-methylethyl)aminoethanesulfonic acid, N- and N,N-di-alkyl derivatives thereof; N-(2-hydroxypropyl)aminoethanesulfonic acid, N- and N,N-di-alkyl derivatives thereof; N-(3-hydroxypropyl)aminoethanesulfonic acid, N- and N,N-di-alkyl derivatives thereof; N-(2-hydroxypentyl)aminoethanesulfonic acid, N- and N,N-di-alkyl derivatives thereof; N-(2-hydroxy-2-methylbutyl)aminoethanesulfonic acid, N- and N,N-di-alkyl derivatives thereof; N-(2-hydroxy-1-methylpropyl)aminoethanesulfonic acid, N- and N,N-di-alkyl derivatives thereof; N-(1,1,2,2-tetramethyl-2-hydroxyethyl)aminoethanesulfonic acid, N- and N,N-di-alkyl derivatives thereof; N-(1,5-dimethyl-5-hydroxypentyl)aminoethanesulfonic acid, N- and N,N-di-alkyl derivatives thereof; N-(1,2-diisopropyl-2-hydroxyethyl)aminoethanesulfonic acid, N- and N,N-di-alkyl derivatives thereof; N-(2,3-dihydroxypropyl)aminoethanesulfonic acid, N- and N,N-di-alkyl derivatives thereof; N-(1-hydroxymethyl-2-hydroxyethyl)aminoethanesulfonic acid, N- and N,N-dialkyl derivatives thereof; N-(1-hydroxymethyl-2-hydroxypropyl)aminoethanesulfonic acid, N- and N,N-di-alkyl derivatives thereof; N-(1-hydroxymethyl-3-hydroxypropyl)aminoethanesulfonic acid, N- and N,N-di-alkyl derivatives thereof; N-(1-hydroxymethyl-4-hydroxybutyl)aminoethanesulfonic acid, N- and N,N-di-alkyl derivatives thereof; N-{1,1-bis(hydroxymethyl)-2-hydroxyethyl}aminoethanesulfonic acid, N- and N,N-di-alkyl derivatives thereof; N-{2,2-bis(hydroxymethyl)-3-hydroxypropyl}-aminoethanesulfonic acid, N- and N,N-di-alkyl derivatives thereof; N,N-bis(2-hydroxyethyl)aminoethanesulfonic acid and N-alkyl derivatives thereof; N-(2-hydroxyethyl)-N-(2-hydroxypropyl)aminoethanesulfonic acid and N-alkyl derivatives thereof; N,N-bis(2-hydroxypropyl)aminoethanesulfonic acid and N-alkyl derivatives thereof; N,N-bis(4-hydroxybutyl)aminoethanesulfonic acid and N-alkyl derivatives thereof; N-(2-hydroxyethyl)-N-{1,1-bis(hydroxyethyl)-2-hydroxyethyl}aminoethanesulfonic acid and N-alkyl derivatives thereof; N-(3-hydroxypropyl)-N-{1,1-bis(hydroxymethyl)2-hydroxyethyl}aminoethanesulfonic acid and N-alkyl derivatives thereof; N,N-bis(2,3-dihydroxypropyl)aminoethanesulfonic acid and N-alkyl derivatives thereof; N,N-bis(1-hydroxymethyl-2-hydroxyethyl)aminoethanesulfonic acid and N-alkyl derivatives thereof; N,N-bis{1,1-bis(hydroxymethyl)-2-hydroxyethyl}aminoethanesulfonic acid and N-alkyl derivative thereof; N,N,N-tris(2-hydroxyethyl)ammonioethanesulfonic acid betaine; N,N-bis(2-hydroxyethyl)-N-(3-hydroxypropyl)ammonioethanesulfonic acid betaine; N,N,N-tris(3-hydroxypropyl)ammonioethanesulfonic acid betaine; 3-N-(2-hydroxypropyl)aminopropanesulfonic acid, N- and N,N-di-alkyl derivatives thereof; 3-N-(1-hydroxymethylethyl)aminopropanesulfonic acid, N- and N,N-di-alkyl derivatives thereof; 3-N-(2-hydroxypropyl)aminopropanesulfonic acid, N- and N,N-di-alkyl derivatives thereof; 3-N-(3-hydroxypropyl)aminopropanesulfonic acid, N- and N,N-di-alkyl derivatives thereof; 3-N-(2-hydroxypentyl)aminopropanesulfonic acid, N- and N,N-di-alkyl derivatives thereof; 3-N-(2-hydroxy-2-methylbutyl)aminopropanesulfonic acid, N- and N,N-di-alkyl derivatives thereof; 3-N-(2-hydroxy-1-methylpropyl)aminopropanesulfonic acid, N- and N,N-di-alkyl derivatives thereof; 3-N-(1,1,2-trimethyl-2-hydroxypropyl)aminopropanesulfonic acid, N- and N,N-di-alkyl derivatives thereof; 3-N-(1,5-dimethyl-5-hydroxyhexyl)aminopropanesulfonic acid, N- and N,N-di-alkyl derivatives thereof; 3-N-(1,2-diisopropyl-2-hydroxyethyl)aminopropanesulfonic acid, N- and N,N-di-alkyl derivatives thereof; 3-N-(2,3-dihydroxypropyl)aminopropanesulfonic acid, N- and N,N-di-alkyl derivatives thereof; 3-N-(1-hydroxymethyl-2-hydroxyethyl)aminopropanesulfonic acid, N- and N,N-di-alkyl derivatives thereof; 3-N-(1-hydroxymethyl-2-hydroxypropyl)aminopropanesulfonic acid, N- and N,N-di-alkyl derivatives thereof; 3-N-(1-hydroxymethyl-3-hydroxypropyl)aminopropanesulfonic acid, N- and N,N-di-alkyl derivatives thereof; 3-(1-hydroxymethyl-4-hydroxybutyl)aminopropanesulfonic acid, N- and N,N-di-alkyl derivatives thereof; 3-N-{1,1-bis(hydroxymethyl)-2-hydroxyethyl}aminopropanesulfonic acid, N- and N,N-di-alkyl derivatives thereof; 3-N-{2,2-bis(hydroxymethyl)-3-hydroxypropyl}aminopropanesulfonic acid, N- and N,N-di-alkyl derivatives thereof; 3-{N,N-bis(2-hydroxyethyl)amino}propanesulfonic acid and N-alkyl derivatives thereof; 3-{N-(2-hydroxyethyl)-N-(2-hydroxypropyl)amino}propanesulfonic acid and N-alkyl derivatives thereof; 3-{N,N-bis(2-hydroxypropyl)amino}propanesulfonic acid and N-alkyl derivatives thereof; 3-{N,N-bis(4-hydroxybutyl)amino}propanesulfonic acid and N-alkyl derivatives thereof; 3-{N-(2-hydroxyethyl)-N-(1,1-bis-hydroxymethyl-2-hydroxyethyl)amino}propanesulfonic acid and N-alkyl derivatives thereof; 3-{N,N-bis(2,3-dihydroxypropyl)amino}propanesulfonic acid and N-alkyl derivatives thereof; 3-{N,N-bis(1-hydroxymethyl-2-hydroxyethyl)amino}-propanesulfonic acid and N-alkyl derivatives thereof; 3-{N,N-bis(1,1-bis-hydroxymethyl-2-hydroxyethyl)amino}propanesulfonic acid and N-alkyl derivatives thereof; 3-{N,N,N-tris(2-hydroxyethyl)ammonio}propane sulfonic acid betaine; 3-{N,N-bis(2-hydroxypropyl)-N-(3-hydroxypropyl)ammonio}propanesulfonic acid betaine; 3-{N,N,N-tris(3-hydroxypropyl)ammonio}propanesulfonic acid betaine; 5-(N-2-hydroxyethylamino)pentanesulfonic acid, N- and N,N-di-alkyl derivatives thereof; 5-{N,N-bis(2-hydroxyethyl)amino}pentanesulfonic acid and N-alkyl derivatives thereof; 5-{N,N,N-tris(2-hydroxyethyl)ammonio}pentanesulfonic acid betaine; 2-hydroxyethylamine-N,N-bis(ethanesulfonic acid); 2-hydroxypropylamine-N,N-bis-(ethanesulfonic acid); 2,3-dihydroxypropylamine-N,N-bis(ethanesulfonic acid); 1,1-bis(hydroxymethyl)-2-hydroxyethylamine-N,N-bis(ethanesulfonic acid); N-(2-hydroxyethyl)-N-(2-sulfoethyl)aminopropanesulfonic acid; N-(2-hydroxypropyl)-N-(2-sulfoethyl)aminopropanesulfonic acid; N-(2,3-dihydroxypropyl)-N-(2-sulfoethyl)aminopropanesulfonic acid; N-{1,1-bis(hydroxymethyl)-2-hydroxyethyl}-N-(2-sulfoethyl)aminopropanesulfonic acid; N-(2-hydroxyethyl)orthanilic acid; N-(2-hydroxyethyl)methanilic acid; N-(2-hydroxyethyl)sulfanilic acid; N,N-bis(2-hydroxyethyl)orthanilic acid; N,N-bis(2-hydroxyethyl)metanilic acid; N,N-bis(2-hydroxyethyl)sulfanilic acid and the like. Salts of these compounds with alkali metals, ammonia or amines may also be used. The amount of these compounds may vary from 0.05 to 30% by weight, preferably from 0.1 to 20% by weight based on the total weight of the reaction components.

The alkyd resin compositions containing the above ampho-ionic component are useful as vehicles of solvent type coating compositions. In most instances, the coating composition contains, in addition to the resin composition and a solvent, a pigment composition (colorant, extender and rust preventive) and various additives such as fillers, thickening agents, surface conditioners, dryers and the like known in the art. The coating compositions may be applied by conventional coating techniques to a desired thickness and dried at room temperature or cured by baking.

The alkyd resin compositions of this invention are well compatible with other resinous compositions.

Thermosetting coating compositions may be produced by admixing 5 to 100 parts, preferably 7 to 90 parts by weight of an aminoplast such as melamine, guanamine or urea resins with 100 parts by weight of the alkyd resin composition of this invention. The ampho-ionic groups present in the alkyd resin are not only combined with the aminoplast through cross-linking reaction, but also catalytically promote the cross-linking reaction between carboxyl and hydroxyl groups present in the alkyd resin with the aminoplast. Consequently, the thermosetting compositions may be cured under milder conditions than those required for corresponding compositions free from said ampho-ionic groups. Typically the coating may be cured at a temperature from 70° to 220° C. for 0.5 to 120 minutes.

The alkyd resin compositions containing ampho-ionic groups have excellent pigment-dispersion properties. Accordingly, it is often advantageous to prepare a pigment paste from a portion of the alkyd resin and then mix the remaining portions and other ingredients with the pigment paste.

The following examples will further illustrate the present invention. All parts and percentages in the examples are by weight unless otherwise specified.

EXAMPLE 1

A two liter flask provided with stirring means, decanting means, temperature-controlling means, a reflux condenser and nitrogen gas-introducing means was charged with 191 parts of N-2-hydroxyethyltaurine, 140 parts of ethylene glycol, 170 parts of triethylene glycol, 331 parts of adipic acid, 168 parts of phthalic anhydride and 40 parts of xylene. The mixture was heated to boiling. Water formed as a by-product was continuously removed by azeotropic distillation with xylene. The temperature was elevated to 190° C. requiring for about 2 hours from the beginning of distillation. The reaction was continued under stirring and refluxing until the acid number corresponding to carboxylic acid component was less than 10.

The resultant oil-free polyester had an acid number of 79, a hydroxyl value of 79 and an average molecular weight ($\overline{Mn}$) of 708.

EXAMPLE 2

A flask as used in Example 1 was charged with 139 parts of N-2-hydroxyethyltaurine, 110 parts of trimethylolpropane, 121 parts of phthalic anhydride, 308 parts of azelaic acid and 27 parts of xylene. The mixture was heated to boiling. Water formed as a by-product was continuously removed by azeotropic distillation with xylene. The temperature was elevated to 190° C. requiring for about 2 hours from the beginning of distillation. The reaction was continued under stirring and refluxing until the acid number corresponding to carboxylic acid component was 145.

After cooling the mixture to 140° C., 392 parts of AOE-X24 (α-olefin oxide sold by Daicel Ltd.) were added dropwise for 30 minutes and the mixture was stirred at said temperature for 2 hours.

The resultant oil-free polyester had an acid number of 57, hydroxyl value of 150 and an average molecular weight ($\overline{Mn}$) of 1040.

EXAMPLES 3 to 9

Following the procedure as described in Example 1 or Example 2, oil-free polyesters were produced by reacting respective components as shown in Table 1. The properties of the resultant resins are also shown in Table 1.

The polyester resins produced in Example 1 through Example 9 were tested on their solubilities in various solvent by adding one part of the resin into 9 parts of a solvent in a test tube, heating to a temperature from 50° to 80° C. and cooling to 25° C. The results are shown in Table 1, wherein symbols have the following meanings:

O = dissolving homogeneously
Δ = slightly turbid
X = phase separation or intensively turbid

TABLE 1

| components (parts) | EX. 1 | | EX. 2 | | EX. 3 | | EX. 4 | | EX. 5 | | EX. 6 | |
|---|---|---|---|---|---|---|---|---|---|---|---|---|
| | HET | 191 | HET | 139 | BHET | 191 | BHET | 134 | BHET | 196 | TES | 123 |
| | EG | 140 | TMP | 110 | 1,6-HDO | 211 | NPG | 130 | AZA | 345 | NPG | 167 |
| | TEG | 170 | PAn | 121 | EG | 56 | AZA | 236 | CaE$_{10}$ | 459 | EG | 67 |
| | ADA | 331 | AZA | 308 | SBA | 542 | PAn | 186 | | | ADA | 235 |
| | PAn | 168 | AOE-X24 | 322 | | | CaE$_{10}$ | 314 | | | AZA | 303 |
| | | | | | | | | | | | AOE | |

TABLE 1-continued

|  |  |  |  |  |  | −X24 | 105 |
|---|---|---|---|---|---|---|---|
| acid number | 79 | 57 | 69 | 59 | 88 |  | 50 |
| OH value | 79 | 105 | 125 | 90 | 141 |  | 117 |
| $\overline{Mn}$ | 708 | 1040 | 807 | 1054 | 720 |  | 1125 |
| water | X | X | X | X | X |  | X |
| methanol | O | Δ | O | O | O |  | Δ |
| n-butanol | Δ | Δ | Δ | O | Δ |  | Δ |
| methylcellosolve | O | O | O | O | O |  | O |
| cellosolveacetate | O | O | O | O | Δ |  | O |
| n-butyl acetate | Δ | O | Δ | O | X |  | O |
| MIBK | X | O | Δ | O | X |  | O |
| xylene | X | O | Δ | O | X |  | O |

|  | EX. 7 | EX. 8 | EX. 9 | Ampho-ionic compound | |
|---|---|---|---|---|---|
| components (parts) | HDES 174<br>EG 78<br>NPG 131<br>ADA 367<br>PAn 93<br>CaE$_{10}$ 157 | HDES 211<br>NPG 158<br>TMAn 146<br>AZA 340<br>CaE$_{10}$ 226 | HCES 340<br>NPG 94<br>AZA 340<br>CaE$_{10}$ 226 | OES | HCES |
| acid number | 102 | 106 | 62 | 237 | 154 |
| OH value | 102 | 106 | 62 |  | 154 |
| $\overline{Mn}$ | 1348 | 919 | 908 | 237 | 365 |
| water | X | X | X | O | X |
| methanol | Δ | O | O | X | X |
| n-butanol | Δ | O | Δ | X | X |
| methylcellosolve | O | O | O | X | X |
| cellosolveacetate | O | O | Δ | X | X |
| n-butyl acetate | O | O | Δ | X | X |
| MIBK | O | Δ | X | X | X |
| xylene | O | Δ | X | X | X |

Abbreviations in Table 1 have the following meanings:

Ampho-ionic compounds

HET = N-2-hydroxyethyltaurine
BHET = N,N-bis(2-hydroxyethyl)taurine
TES = N-tris(hydroxymethyl)methyltaurine
HDES = 2-hydroxyethylamine-N,N-bis(ethanesulfonic acid)
HCES = N-β-hydroxycetyltaurine
OES = N-octyltaurine Polybasic acids ADA = adipic acid
PAn = phthalic anhydride
AZA = azelaic acid
SBA = sebacic acid
TMAn = trimellitic anhydride Polyols EG = ethylene glycol
TEG = triethylene glycol
TMP = trimethylolpropane
1,6-HDO = 1,6-hexanediol
NPG = neopentyl glycol Oxirane compounds CaE$_{10}$ = glycidyl ester of versatic acid commercial available from Shell Chemical Company as CARDURA E10
AOE-X24 = α-olefin oxide commercially available from Daicel Ltd. as AOE-X24
BGE = butyl glycidyl ether commercially available from Nippon Oil & Fats Co., Ltd as NISSAN EPIOL-B The polyester resins produced in Examples 4 and 7 were tested on their compatibilities with conventional solvent type resin compositions by mixing 1 part of the resin of this invention with 1 part of a coconut oil modified alkyl resin (BEGKOSOL 1323, oil length 32%), or an oil-free alkyd resin (BECKOLITE M6402-50), or a butylated melamine resin (SUPER BECKAMINE J820-60), all commercially available from Dainippon Ink and Chemicals, Ltd. The results are shown in Table 2, wherein symbols have the following meanings:
 = dissolving homogeneously
Δ = slightly turbid
X = phase separation or intensively turbid

TABLE 2

|  |  |  | Ampho-ionic compound | |
|---|---|---|---|---|
|  | EX. 4 | EX. 7 | OES | HCES |
| BECKOSOL 1323 | O | Δ | X | X |
| BECKOLITE M6402-50 | O | O | X | X |
| SUPER BECKAMINE J820-60 | O | O | X | X |

EXAMPLE 10

1st stage

A flask as used in Example 1 was charged with 994 parts of linseed oil, 183 parts of pentaerythritol and 15 parts lead naphthenate. The mixture was stirred at 240° C. under nitrogen gas current for 30 minutes whereupon methanol tolerance was infinite.

2nd stage

The inner temperature was allowed to fall to 150° C. without stirring. To the reaction mixture were added 321 parts of phthalic anhydride, 5,5 parts of N,N-bis(2-hydroxyethyl)aminoethanesulfonic acid and 45 parts of xylene. The mixture was heated again with stirring. Water formed as a by-product was continuously removed by azeotropic distillation with xylene. The temperature was elevated in 240° C. requiring for about 2 hours. The reaction was continued under stirring and refluxing at said temperature until the acid number corresponding to carboxylic acid component was 8. The resultant resin had an oil length of 65, an acid number of 8.5, a hydroxyl value of 50 and an average molecular weight ($\overline{Mn}$) of 1800.

This resin was diluted with xylene to a nonvolatile content of 70%. The resultant alkyd varnish had a viscosity of Z when measured Gardener viscometer.

EXAMPLES 11 TO 18

Following the procedure as described in Example 10, similar alkyd resins were produced by reacting respective components as shown in Table 3. The properties of the resins are also shown in Table 3.

(4) N,N,N-tris(2-hydroxyethyl)ammoniopropanesulfonic acid betaine.
(5) N-(2,3-dihydroxypropyl)-N-octylaminotaurine
(6) N-3-hydroxypropyl-N-{1,1-bis(hydroxymethyl)-2-hydroxyethyl}aminoethanesulfonic acid

EXAMPLE 19

A flask as used in Example 1 was charged with 81 parts of dehydrated castor oil, 59 parts of coconut fatty acid, 121 parts of trimethylolpropane, 715 parts of phthalic anhydride, 481 parts of diethylene glycol, 80 parts of N-methyl-N-(1-hydroxymethyl-2-hydroxyethyl)aminomethanesulfonic acid and 45 parts of xylene.

TABLE 3

| | | EX. 11 | EX. 12 | EX. 13 | EX. 14 | EX. 15 | EX. 16 | EX. 17 | EX. 18 | CONTROL 1 | CONTROL 2 |
|---|---|---|---|---|---|---|---|---|---|---|---|
| components 1st stage (parts) | SO | 676 | — | — | — | — | — | — | — | — | — |
| | DCO | — | 260 | 85 | 85 | 85 | — | 260 | 85 | — | 260 |
| | CO | — | 192 | 63 | 63 | 63 | — | 193 | 63 | — | 192 |
| | LO | — | — | — | — | — | 994 | — | — | 994 | — |
| | PE | 208 | — | — | — | — | 169 | 166 | — | 183 | — |
| | TMP | — | 160 | 50 | 50 | 53 | — | — | 53 | — | 160 |
| | ampho-ionic | — | — | (3) 6 | (4) 7 | — | (6) 30 | — | — | — | — |
| components 2nd stage (parts) | PAn | 527 | 578 | — | 765 | 767 | — | 554 | 725 | 321 | 578 |
| | IPA | — | — | 753 | — | — | — | — | — | — | — |
| | ADA | — | — | — | — | — | 316 | — | — | — | — |
| | EG | 74 | — | — | — | — | 2 | — | — | — | — |
| | DEG | — | 59 | 278 | — | 53 | — | 320 | 343 | — | 65 |
| | TMP | — | 243 | 276 | 441 | 455 | — | — | 43 | — | 243 |
| | ampho-ionic compound | (1) 50 | (2) 15 | — | (2) 197 | (5) 75 | — | (2) 10 | (2) 375 | — | — |
| alkyd resin properties | oil length | 45 | 30 | 10 | 10 | 10 | 65 | 30 | 10 | 65 | 10 |
| | acid number | 16.5 | 10.5 | 8.5 | 4.1 | 16 | 12 | 9.5 | 6.6 | 8.5 | 8.5 |
| | OH value | 80 | 100 | 100 | 100 | 100 | 50 | 100 | 100 | 50 | 100 |
| varnish | $\overline{Mn}$ | 1830 | 1520 | 1500 | 4000 | 5000 | 1800 | 800 | 800 | 1810 | 1500 |
| | nonvolatile (%) | 60 | 60 | 60 | 60 | 60 | 70 | 70 | 60 | 70 | 60 |
| | viscosity | Z | Z | Z | $Z_4$ | $Z_4$ | Y | X | $Z_2$ | Y | Z |

Abbreviations in Table 3 have the following meanings:
SO=soybean oil
DCO=dehydrated castor oil
CO=coconut oil
LO=linseed oil
PE=pentaerythritol
TMP=trimethylolpropane
PAn=phthalic anhydride
ADA=adipic acid
EG=ethylene glycol
DEG=diethylene glycol
Ampho-ionic compounds used are as follows:
(1) N-(2,3-dihydroxypropyl)aminopropanesulfonic acid
(2) N,N-bis(2-hydroxyethyl)aminoethanesulfonic
(3) N-{1,1-bis(hydroxymethy)-2-hydroxyethyl}taurine The mixture was heated to 240° C. with stirring. Water formed as a by-product was removed by azeotropic distillation with xylene. The reaction was continued until the acid number corresponding to carboxylic acid component was 8. The resultant alkyd resin had an oil length of 10, an acid number of 22.5, a hydroxyl value of 100 and an average molecular weight ($\overline{Mn}$) of 800. The resin was diluted with xylene to a nonvolatile content of 60%.

The resultant varnish had a Gardener viscosity of Z.

EXAMPLES 20 TO 23

Following the procedure as described in Example 19, similar alkyd resins were produced by reacting respective components as shown in Table 4. The properties of the resins are also shown in Table 4.

TABLE 4

| | | EX. 20 | EX. 21 | EX. 22 | EX. 23 | CONTROL 3 |
|---|---|---|---|---|---|---|
| components (parts) | DCAFA | 243 | 81 | 140 | 243 | 81 |
| | CFA | 177 | 59 | — | 177 | 59 |
| | TMP | 458 | 478 | 533 | 465 | 478 |
| | PAn | 550 | 751 | 764 | 550 | 751 |
| | DEG | 63 | — | 40 | 60 | 131 |
| | ampho-ionic compound | (3) 12 | (2) 263 | (7) 105 | (8) 15 | — |
| alkyd resin properties | oil length | 30 | 10 | 10 | 30 | 10 |
| | acid number | 10 | 50.5 | 25.5 | 12 | 8 |
| | OH value | 100 | 100 | 100 | 100 | 100 |
| varnish | $\overline{Mn}$ | 1390 | 2470 | 2460 | 1200 | 2470 |
| | nonvolatile (%) | 60 | 60 | 60 | 60 | 60 |

TABLE 4-continued

|  | EX. 20 | EX. 21 | EX. 22 | EX. 23 | CONTROL 3 |
|---|---|---|---|---|---|
| viscosity | Z | $Z_3$ | $Z_2$ | Z | Z |

Abbreviations have the following meanings:
DCOFA = dehydrated cator oil fatty acid
CFA = coconut fatty acid
Ampho-ionic compounds used are as follows:
(7) N,N-dimethyl-N-(2-hydroxyethyl)ammoniopropanesulfonic acid betaine
(8) 2-hydroxyethylamine-N,N-bis(ethanesulfonic acid)
Other abbreviations and ampho-ionic compounds are the same as in Table 3.

EXAMPLE 24

158 parts of the alkyd resin varnish produced in Example 11, 8.5 parts of butylated melamine resin varnish commercially available from Dainippon Ink And Chemicals Ltd. as SUPER BECKAMINE G-821-60 and 100 parts of petroleum solvent sold as SOLVESSO were mixed in a labomixer at room temperature.

The resulting thermosetting composition was applied onto tinplate pieces to produce dry films of 30μ thickness. The coated pieces were than baked for 20 minutes at 100° C., 120° C., 140° C. or 160° C. respectively. The films were extracted with acetone using soxhlet extractor for 4 hours. Unextracted residues were 68%, 88%, 92% and 96% when baked at 100° C., 120° C., 140° C. and 160° C. respectively.

EXAMPLE 25

117 parts of the alkyd resin varnish of Example 12, 50 parts of SUPER BECKAMINE G-821-60 and 100 parts of SOLVESSO were mixed as in Example 24. The resulting composition was applied onto a tinplate piece to produce a dry film of 40μ thickness which gave, when baked at 140° C. for 20 minutes, a transparent coating having pencil hardness of H and a cross-linking density of $2.08 \times 10^{-3}$ mol/cm$^3$.

For comparison, the above procedure was repeated except that the alkyd resin varnish of Control 2 in Table 3 was replaced for that of Example 12. The resulting transparent coating had pencil hardness of HB and a cross-linking density of $1.22 \times 10^{-3}$ mol/cm$^3$.

EXAMPLE 26

The procedure of Example 24 was repeated except that 133 parts of each varnish of Examples 13 to 15 and 18 to 23 or 114 parts of the varnish of Example 17 were mixed with 33 parts of SUPER BECKAMINE G-821-60. All of the films, when baked at 120° C. for 20 minutes, gave transparent coatings which exhibited unextracted residues of greater than 87% upon the acetone extraction test.

EXAMPLES 27 AND 28

50 parts of each varnish produced in Example 10 and 16 and Control 1 were thoroughly mixed with 27 parts of titanium dioxide pigment, 10 parts of calcium carbonate pigment, 0.3 parts of lead naphthenate and 8 parts of aliphatic hydrocarbon solvent in a paint conditioner for 30 minutes. The resulting coating compositions were applied onto steel plates to produce dry films of 40μ thickness, respectively, and dried at toom temperature.

The properties of the coatings are shown in Table 5.

TABLE 5

| varnish | tack-free time (min.) | semi-curing time (hrs.) | 60° gloss, 24 hours | brightness |
|---|---|---|---|---|
| Example 10 | 10 | 2 | 93 | very good |
| Example 16 | 10 | 2 | 93 | very good |
| Control 1 | 15 | 3 | 91 | good |

Brightness was observed visually.

EXAMPLE 29

A pigment paste was produced by mixing 225 parts of the varnish of Example 12, 90 parts of anthraquinone red pigment (CROMOPHTAL RED A3B, (Ciba), 132 parts of xylene and 53 parts of ethylene glycol monobutyl ether for 2 hours in a paint conditioner, and grinding to coarse particle size of 5μ.

A thermosetting coating composition was prepared by combining 28 parts of the pigment paste prepared as described above with 28 parts of SUPER BECKAMINE G-821-60 with stirring for 20 minutes.

A steel plate which was previously given a middle coating of alkyd-melamine type (OTO-778, Nippon Paint Co., Ltd.) was coated by the above composition to produce a dry film of 40μ thickness, which was, in turn, baked at 140° C. for 20 minutes.

For comparison, the above procedure was repeated except that the varnish obtained in Control 2 was replaced for that of Example 12 and the mixing time in paint conditioner was extended to 3 hours.

The properties of resultant pigment pastes, coating compositions and cured films are shown in Table 6.

TABLE 6

|  |  | varnish | |
|---|---|---|---|
|  |  | Example 12 | Control 2 |
| viscosity*1 of pigment paste | $V_2$ (cps)*2 | $1.2 \times 10^5$ | $3.9 \times 10^5$ |
|  | $V_{20}$ (cps)*3 | $3.0 \times 10^4$ | $5.1 \times 10^4$ |
|  | TI*4 | 4 | 7.6 |
| viscosity*1 of coating composition | $V_2$ (cps) | $4.8 \times 10^3$ | $2.0 \times 10^3$ |
|  | $V_{20}$ (cps) | $3.0 \times 10^3$ | $4.0 \times 10^3$ |
|  | TI | 1.6 | 5 |
| properties of cured film | gloss*5 | 100 | 100 |
|  | water-resistance*6 | no change | slight blister |
|  | HCl-resistance*7 | no change | slight discoloration |

*1Brookfield viscosity (H type), 25° C.
*2Viscosity at 2 r.p.m.
*3Viscosity at 20 r.p.m.
*4$V_2/V_{20}$
*5Measured by 60° gloss meter
*6Appearance after dipping in water for 15 days at 40° C.
*7A hollow glass cylinder was placed on the coated plate.

One ml. of 1 N HCl was dropped into the cylinder and the film was exposed to HCl vapor for 1 hour at 55° C.

EXAMPLE 30

A pigment paste was produced by mixing 70 parts of the varnish of Example 21 with 47 parts of red perylene pigment (PALIOGEN MAROON 4020, BASF), 69 parts of SOLVESSO and 14 parts of n-butanol for 2 hours in a paint conditioner, and grinding to coarse particle size of 5μ.

A thermosetting coating composition was prepared by combining 28 parts of the pigment paste prepared as described above with 40 parts of the varnish of Example 21 and 28 parts of SUPER BECKAMINE G-821-60 with stirring for 20 minutes.

A steel plate which was previously given a middle coating of OTO-778 was coated by the above composition to produce a dry film of 40μ thickness, which was, in turn, baked at 140° C. for 20 minutes.

For comparison, the above procedure was repeated except that the varnish obtained in Control 3 was replaced for that of Example 21 and the mixing time in paint conditioner was extended to 3 hours.

The properties of resultant pigment pastes and cured films are shown in Table 7.

TABLE 7

|  |  | varnish | |
| --- | --- | --- | --- |
|  |  | Example 21 | Control 3 |
| viscosity of | V$_2$ (cps) | 50 | 4.3 × 10$^3$ |
| pigment paste | V$_{20}$ (cps) | 50 | 0.7 × 10$^3$ |
|  | TI | 1 | 6.1 |
| properties of | gloss | 99 | 99 |
| cured film | water-resistance | no change | slight blister |
|  | HCl-resistance | no change | slight discoloration |

The above has been offered for illustrative purposes only, and it is not for the purpose of limiting the scope of this invention, which is defined in the claims below.

We claim:

1. An alkyd resin composition suitable for use in the preparation of solvent type coating composition, said resin composition being characterized by containing an amphoionic group of the formula:

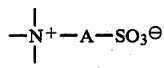

wherein A is C$_1$–C$_6$ alkylene or phenylene, said resin composition comprising the reaction product of: (a) a polyol, (b) a polybasic carboxylic acid, and (c) an ampho-ionic compound of the formula:

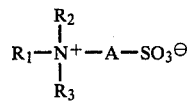

wherein A has the above-indicated values, R$_1$ is alkyl of 1–20 carbon atoms containing at least one hydroxyl group, R$_2$ and R$_3$ are each hydrogen or alkyl of 1–20 carbon atoms which is unsubstituted or substituted by at least one sulfo or hydroxyl group.

2. The alkyd resin composition according to claim 1 further comprising on oxirane ring-containing compound.

3. The alkyd resin composition according to claim 2, wherein said oxirane ring-containing compound is selected from the group consisting of an α-olefine oxide, a glycidyl ether and a glycidyl ether.

4. The alkyd resin composition according to claim 1 further comprising an oil modifier.

5. The alkyd resin composition according to claim 4, wherein said oil modifier is selected from the group consisting of a vegetable oil, tall oil, fatty acids derived from said oils and a synthetic fatty acid.

6. The alkyd resin composition according to claim 1 or 5, wherein said ampho-ionic compound is present from 0.05 to 30% by weight based on the total weight the reaction components.

7. The alkyld resin composition according to claim 1 or 4, wherein said ampho-ionic compound is selected from the group consisting of N-2-hydroxyethyltaurine; N-2-ethylhexyltaurine, N,N-bis(2-hydroxyethyl)taurine; N-tris(hydroxymethyl)methyltaurine; 2-hydroxyethylamin-N,N-bis(ethanesulfonic acid); N-β-hydroxycetyltaurine; N-octyltaurine; N,N-bis(2-hydroxyethyl)aminoethanesulfonic acid; N-(2,3-dihydroxypropyl)aminopropanesulfonic acid; N-{1,1-bis(hydroxymethyl)-2-hydroxyethyl}taurine; N,N,N-tris(2-hydroxyethyl)ammoniopropanesulfonic acid; N-(2,3-dihydroxypropyl)-N-octyltaurine; N-3-hydroxypropyl-N-{1,1-bis(hydroxymethyl)-2-hydroxyethyl}aminoethanesulfonic acid; N-methyl-N-(1-hydroxymethyl-2-hydroxyethyl)aminomethanesulfonic acid; and N,N-dimethyl-N-(2-hydroxyethyl)ammoniopropanesulfonic acid betaine.

8. A solvent type coating composition comprising the alkyld resin composition according to claim 4.

9. The coating composition according to claim 8 further comprising an amino plast.

10. The coating composition according to claim 9, wherein said amino plast is present from 5 to 100 parts by weight per 100 parts of said alkyd resin composition.

11. The coating composition according to claim 9, wherein said aminoplast is a melamine resin.

* * * * *